United States Patent [19]

Jansen et al.

[11] Patent Number: 4,691,311
[45] Date of Patent: Sep. 1, 1987

[54] DISC READING APPARATUS WITH DISC SHOOT JOURNALED IN FRAME

[75] Inventors: Gerardus L. M. Jansen, Colorado Springs, Colo.; Henricus J. Smulders; Pieter D. Schuitmaker, both of Eindhoven, Netherlands

[73] Assignee: U.S. Philips Corporation, New York, N.Y.

[21] Appl. No.: 752,885

[22] Filed: Jul. 8, 1985

[30] Foreign Application Priority Data

Jul. 10, 1984 [NL] Netherlands ............... 8402176

[51] Int. Cl.$^4$ ............................................. G11B 7/00
[52] U.S. Cl. ............................................. 369/100
[58] Field of Search ............... 369/75.1, 266, 44, 45, 369/46, 100, 111; 360/97, 137

[56] References Cited

U.S. PATENT DOCUMENTS

| 3,912,278 | 10/1975 | Teutsch | 360/97 |
| 4,150,406 | 4/1979 | Stollorz | 360/97 |
| 4,152,728 | 5/1979 | Camerik | 369/111 |
| 4,358,803 | 11/1982 | Van Der Giessen | 360/97 |
| 4,389,717 | 6/1983 | Camerik | 369/111 |
| 4,545,046 | 10/1985 | Jansen et al. | 369/111 |

Primary Examiner—Donald McElheny, Jr.
Attorney, Agent, or Firm—F. Brice Faller

[57] ABSTRACT

Apparatus for writing and/or reading information in an information surface of a rotating disc by means of a radiation spot (5) includes a one-piece injection-moulded or die-cast frame (11) and a motor unit (57) with a motor shaft (43) which carries a turntable (45) and which is journalled in the frame (11). The device further comprises an optical system with a movable lens system (17), and a lens-system driving device (13) with a movable lens carrier (15).

6 Claims, 5 Drawing Figures

DISC READING APPARATUS WITH DISC SHOOT JOURNALED IN FRAME

FIELD OF THE INVENTION

The invention relates to an apparatus for reading information on the surface of a rotating disc by means of a radiation spot. The apparatus includes a one-piece frame, an electric motor having a shaft which carries a turntable for the disc, a lens system movable parallel to and substantially perpendicular to the information surface, and a lens-system driving device supported by guide means secured to the frame.

BRIEF DESCRIPTION OF THE PRIOR ART

European Patent Application EP No. 45 537 to which U.S. Pat. No. 4,389,717 corresponds (herewith incorporated by reference) discloses a video disc player having an electric motor fastened to an injection molded frame. The motor shaft, which carries centering means and a supporting table for the video disc, is journalled in a stationary part of the electric motor; European Patent Application No. 30,754 to which U.S. Pat. No. 4,358,803 corresponds shows how the motor shaft is journalled. It is important that the motor shaft is positioned accurately with respect to the path of movement of the lens carrier. In particular, care must be taken that the motor shaft extends exactly parallel to the optical axis of the lens system in order to ensure that the optical axis is perpendicular to the information surface of the disc to preclude the occurrence of coma as a result of which the radiation spot becomes too large, which may give rise to, inter alia, cross-talk between neighbouring tracks.

In the known apparatus the motor shaft is aligned and positioned accurately by means of locating faces on the frame, to which the electric motor is secured with corresponding, accurately machined locating faces on the motor housing. The position of the motor shaft further depends on the arrangement of the bearings in the motor housing and on the accuracy of the bearings themselves. The final tolerance of the motor shaft position is determined by the sum of the manufacturing tolerances of the locating faces and of the relevant parts. A drawback of the known construction is the large number of tolerance sources determining the final tolerance, so that very stringent accuracy requirements have to be imposed on the various parts, which is expensive.

SUMMARY OF THE INVENTION

The invention has for its object to improve the known apparatus in such a way that the motor shaft, and hence the turntable can be accurately positioned simply and cheaply.

For this purpose the motor shaft is journalled in a bearing means in the injection-moulded or die-cast frame so that the motor shaft is aligned and positioned in the bearing means of the frame. The present injection-noulding techniques and the available synthetic resins, in particular thermosetting materials based on glass-fibre reinforced phenolic resin, enable products of very accurately defined dimensions to be formed without the need for any finishing operations. In the manufacture of the frame of the apparatus embodying the invention the frame part comprising the bearing means for the shaft is formed in one die section of the injection-moulding die. The frame part may be provided with one or more bearing sleeves of a suitable bearing material, for example, bearing bronze, in which the motor shaft is supported. Advantages of the present apparatus in comparison with the known apparatus are that the number of tolerance sources is smaller and that its manufacture can be simpler and cheaper.

The stationary part of the bearing means may be a cylindrical wall portion of the injection-moulded or die-cast frame. The motor shaft may be mounted directly into the bearing formed by the cylindrical wall portion after injection-moulding of the frame. The bearing means, whose stationary part is an integral part of the frame, may be a sleeve bearing or a helical-groove bearing. The overall tolerance of the motor-shaft position is determined by only two manufacturing tolerances, i.e. the dimensional tolerance of the cylindrical wall portion and the dimensional tolerance of the motor shaft itself. Therefore, a high accuracy can be obtained, whilst the manufacturing costs can be very low.

The frame may form at least a part of the housing of the motor. Since the motor shaft is supported in the frame, the motor housing no longer has to perform this function. Surprisingly, the screening function of the motor housing is taken over by the frame, which yields a further reduction of costs.

DESCRIPTION OF THE PREFERRED EMBODIMENTS

The apparatus shown in FIGS. 1 to 4 serves for reading a disc 3, which is rotatable about an axis of rotation 1, by means of a radiation spot 5. The disc 3 comprises a transparent substrate whose upper side carries an information surface 9 covered with a reflecting layer. The disc may be an optical audio disc, video disc, or data-storage disc.

Figure 1:
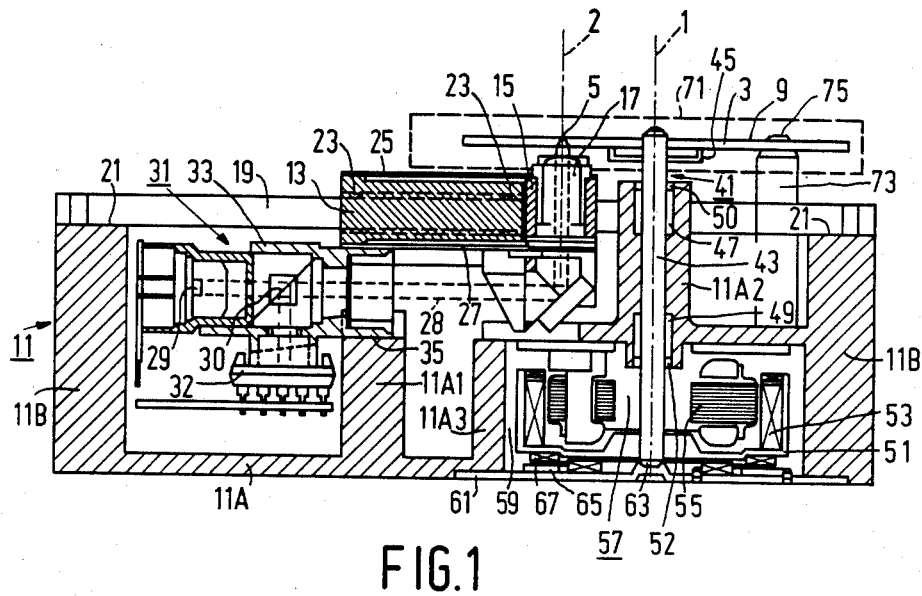
FIG. 1 shows schematically and partly in sectional view an embodiment of the apparatus in accordance with the invention, FIG. 2 a plan view of the injection-moulded frame of the apparatus of FIG. 1.
Figure 2:
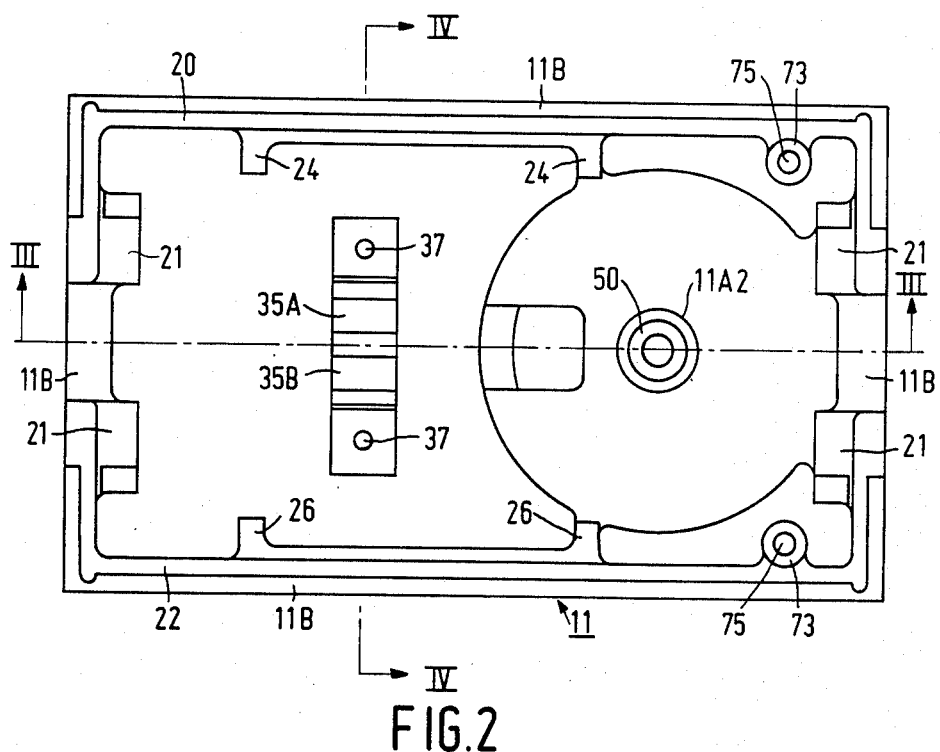
Figure 3:
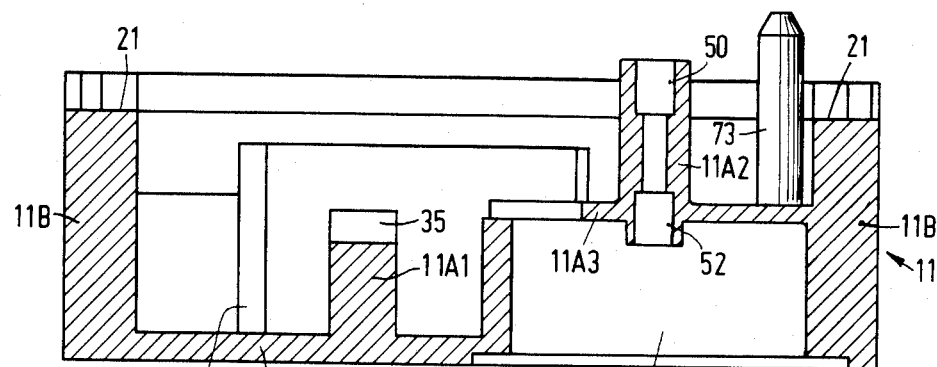
FIG. 3 is a longitudinal sectional view taken on the line III—III in FIG. 2.
Figure 4:
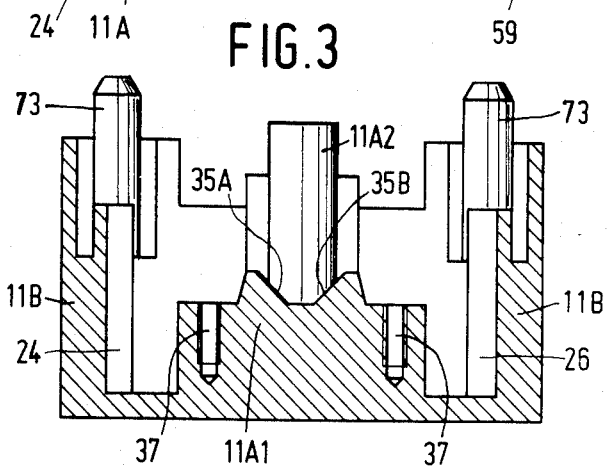
FIG. 4 is a cross-sectional view taken on the line IV—IV in FIG. 2.

The apparatus comprises a frame 11, which is injection-moulded in one piece, and a lens-system driving device 13, which can be translated radially relative to the frame. The lens-system driving device 13 comprises a movable lens carrier 15 comprising a lens system 17, which is movable perpendicular to the disc 3. The lens-system driving device 13 is rectilinearly guided by two parallel rods 19, only one of which is shown in FIG. 1, which rods are secured to locating faces 21 on the frame 11. The lens-system driving device 13 comprises sliding bearings 23, which enable the device 13 to be moved along the rods. For driving the lens-system driving device 13 the frame 11 has two pairs of projections 24 and 26 for supporting magnets which cooperate with driving coils (not shown) of the device 13. The frame 11 has two grooves for supporting ferromagnetic strips 20 and 22. The lens carrier 15, provided with actuator coils (not shown), is supported by the lens-system driving device 13 by means of blade springs 25 and 27 at its upper side and its lower side, respectively, the ends of each spring being secured to the lens carrier 15 and the lens-system driving device 13, respectively by means of bolts. The lens carrier 15, together with the lens system 17, is movable over a limited distance along the optical axis 2 of the lens system 17. The lens system 17 is movable along its optical axis 2 under servo control to follow the movements of the disc 3 with the radiation spot 5 formed by a radiation beam 28 from a radiation source 29. For an elaborate description of the lens-system driving device and the lens system reference is made to Netherlands Patent Application No. 8204981, to which U.S. Pat. No. 4,443,721 corresponds.

The radiation beam 28 emanates from a stationary optical system 31 which includes a housing 33 accurately positioned on the locating face 35 on the frame 11. The position of the stationary system 31 with respect to the lens-system driving device 13 should be exactly defined in any position of the device 13 along its path. The system 31 may be fastened by means of a bracket and bolts (not shown) in the holes 37 of the frame 11.

The optical system 31 includes at least the radiation source 29, formed, for example, by a semiconductor laser, and a semitransparent mirror 30 and a system 32 of light-sensitive semiconductor diodes for converting the radiation-beam modulation into a modulation of an electric signal. Optical systems suitable for converting an optical modulation into an electrical modulation are well known.

The frame 11, which is die-cast or injection-moulded from a suitable material, such as aluminium or a thermo-setting synthetic resin, is roughly shaped as an open box having a profiled bottom 11A and four side walls 11B. Two of the four side walls 11B are provided with locating faces 21 for the rods 19. A locating face 35 for the stationary optical system 31 is formed on an upright wall portion 11A1 of the bottom 11A. The locating face 35 comprises two flat portions 35A and 35B, which together form a V-shaped support.

A turntable driving device 41 for rotatably driving the disc 3 includes a motor shaft 43, which is rotatable about the axis of rotation 1 and which carries a turntable 45 for supporting the disc 3. The motor shaft 43 is journalled in the frame 11. For this purpose, the bottom 11A of the frame 11 comprises a cylindrical portion 11A2 in which bronze bearing bushings 47 and 49 are fitted. The two bearing bushings are aligned with one another and positioned accurately with respect to the lens-system driving device 13 simply by sliding the bearing bushings 47 and 49 into the recesses 50 and 52, respectively, which are formed in the correct positions and with the correct dimensions during injection-moulding.

The motor shaft 43 carries a rotor 51 having a cylindrical magnet 53 which cooperates with a stator 55 secured to the frame 11. The rotor 51 and the stator 55 form parts of an electro-motor unit 57. The bottom 11A of the frame 11 is shaped to form a cavity 59 for the motor unit 57, the part 11A3 surrounding the cavity 59 serving as a motor housing. The motor housing 11A3 is closed by a cover 61, which can be secured to the bottom 11 and which carries a thrust bearing 63 for the motor shaft 43. The cover 61 further carries a coil 65 of a tacho-generator which cooperates with a tachomagnet 67 on the rotor 53.

The optical disc 3 is enclosed in a cassette 71 indicated by a broken line, which is positioned on the apparatus. For this purpose the frame 11 comprises two integral projections 73, each having a tapered free end portion 75 which engages in an opening in the cassette. The cassette bears on locating faces of the projections 73.

Figure 5:
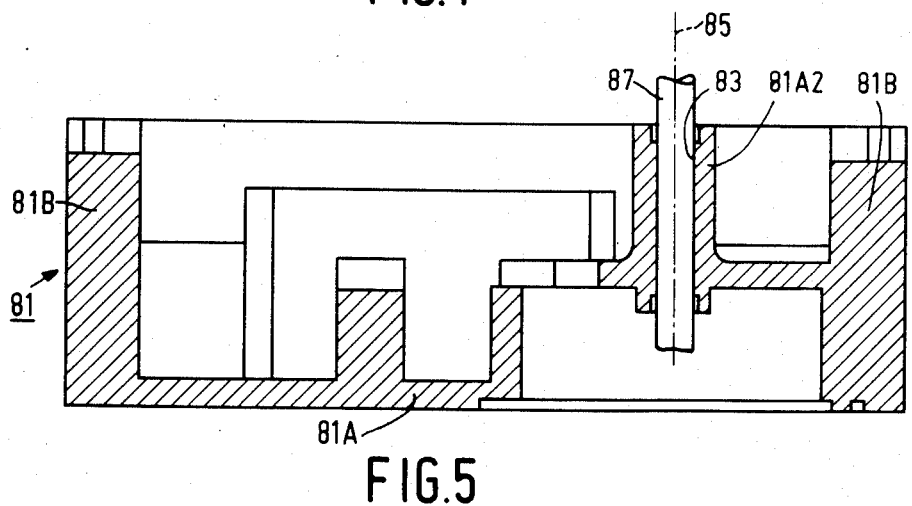
FIG. 5 is a sectional view of an injection-moulded frame of a further embodiment of the invention.

FIG. 5 shows an embodiment comprising a frame 81, which comprises a bottom 81A and upright walls 81B and whose shape and function correspond to those of the frame 11 described above. The frame 81 comprises a cylindrical portion 81A2 having a cylindrical wall portion 83 receiving a motor shaft 87 which is rotatable about an axis of rotation 85 to drive a turntable. The cylindrical wall portion 83 may be perfectly smooth to form a sliding bearing for the shaft. If desired, the cylindrical wall portion 83 may be formed with a fish-bone pattern of grooves in order to form a spiral-groove bearing for the motor shaft 87.

Embodiments other than those shown in the drawings are possible. For example, instead of a translatable lens-system driving device, it is possible to use a pivotable lens-system driving device, which employs a pivotal-arm device. In such a case, the optical system can be pivoted through a limited angle about a pivotal axis which extends parallel to the axis of rotation of the optical disc.

What is claimed is:

1. An apparatus for reading or writing information on an information surface of a rotating disc, said apparatus comprising
    a one piece frame,
    an electric motor having a motor shaft which is rotatable about an axis of rotation and which carries a turntable for the disc, said shaft being journalled in bearing means received directly in said frame,
    a lens system driving device which is movable parallel to the information surface, said driving device being supported by guide means secured directly to said frame,
    a lens system supported by said driving device for movement relative to said driving device in a direction substantially perpendicular to said information surface, said lens system having an optical axis parallel to the axis of rotation of said motor shaft.

2. An apparatus as claimed in claim 1 characterized in that the stationary part of the bearing means comprises a cylindrical wall portion of the frame.

3. An apparatus as claimed in claim 2, characterized in that said one piece frame constitutes at least a part of the housing of the motor.

4. An apparatus as claimed in claim 1, characterized in that said one piece frame constitutes at least a part of the housing of the motor.

5. An apparatus as in claim 1 wherein said one-piece frame is injection moulded.

6. An apparatus as in claim 1 wherein said one-piece frame is die cast.

* * * * *